(12) United States Patent
Morrision et al.

(10) Patent No.: US 9,228,104 B2
(45) Date of Patent: Jan. 5, 2016

(54) METHOD AND APPARATUS FOR CONTROLLING LIGHTNESS IN COLORED INKJET INKS BY MEANS OF A TRANSPARENT WHITE INK COMPOSITION

(71) Applicant: ELECTRONICS FOR IMAGING, INC., Foster City, CA (US)

(72) Inventors: Michael H. Morrision, Meredith, NH (US); Peter Heath, Meredith, NH (US)

(73) Assignee: Electronics for Imaging, Inc., Fremont, CA (US)

( * ) Notice: Subject to any disclaimer, the term of this patent is extended or adjusted under 35 U.S.C. 154(b) by 319 days.

(21) Appl. No.: 13/667,621

(22) Filed: Nov. 2, 2012

(65) Prior Publication Data
US 2014/0125718 A1    May 8, 2014

(51) Int. Cl.
| | |
|---|---|
| C09D 11/40 | (2014.01) |
| B41J 11/00 | (2006.01) |
| B41J 2/21 | (2006.01) |
| C09D 11/101 | (2014.01) |
| C09D 11/322 | (2014.01) |

(52) U.S. Cl.
CPC .............. C09D 11/40 (2013.01); B41J 2/2107 (2013.01); B41J 11/002 (2013.01); C09D 11/101 (2013.01); C09D 11/322 (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072
USPC ......... 347/95, 96, 100, 101, 102, 103, 21, 20, 347/9, 88, 99; 106/31.6, 31.27, 31.13; 523/160, 161
See application file for complete search history.

(56) References Cited

U.S. PATENT DOCUMENTS

| | | | |
|---|---|---|---|
| 4,630,076 A | 12/1986 | Yoshimura | |
| 6,498,222 B1 * | 12/2002 | Kitamura et al. | ............. 347/100 |
| 7,104,642 B2 * | 9/2006 | Takabayashi | ............... 347/100 |

(Continued)

FOREIGN PATENT DOCUMENTS

WO    WO-01/29517    4/2001

*Primary Examiner* — Manish S Shah
(74) *Attorney, Agent, or Firm* — Michael A. Glenn; Perkins Coie LLP

(57) ABSTRACT

A transparent white ink composition is formulated to brighten, lighten and or dilute full-tone primary inkjet colors: cyan; magenta; yellow and black, eliminating the need for 'light ink' primary color inks. The transparent white ink is jetted concurrently with reduced amounts of full-tone inks in lighter tonal areas conventionally supported by 'light ink' primary inks. Printing 'light ink' primary colors using a transparent white ink composition may reduce the number of print channels needed to print all four primary colors and the four 'light ink' primary colors. Embodiments of the transparent white ink composition may be solvent- or water-based, drying by evaporation of the carrier fluid. Other embodiments may be radiation-curable ink compositions. An inkjet printer includes print carriage and print head assemblies configured for jetting a primary color ink and the transparent white ink in the same pass in correct proportions to achieve a desired effect.

8 Claims, 6 Drawing Sheets

(56) References Cited

U.S. PATENT DOCUMENTS

| | | | |
|---|---|---|---|
| 2004/0019128 A1* | 1/2004 | Kondo | 522/167 |
| 2006/0158481 A1 | 7/2006 | Spevak et al. | |
| 2010/0039463 A1 | 2/2010 | Van Thillo et al. | |
| 2011/0045199 A1 | 2/2011 | Cong | |

* cited by examiner

METHOD AND APPARATUS FOR CONTROLLING LIGHTNESS IN COLORED INKJET INKS BY MEANS OF A TRANSPARENT WHITE INK COMPOSITION

BACKGROUND

1. Field of the Invention

In general the invention relates to the field of inkjet printing. More particularly, the invention relates to a method and apparatus for controlling lightness in colored inkjet inks by means of a transparent white ink composition.

2. Background Information

Conventionally, in color inkjet printing, the printer must print several of the printer's dots for each pixel of an image. Inkjet printers may print only a few colors: for example, cyan, magenta, yellow and black. Rendering each pixel of an image into various colors, shades, and intensities requires that the image be dithered, meaning that the printer creates patterns of dots in multiple colors in order to simulate the color of each pixel in the image. Additionally, some inkjet printers also print lighter values of the same four colors. Thus, conventional inkjet printers now typically use eight colors: cyan, light cyan, magenta, light magenta yellow, light yellow, black and light black. Currently, an inkjet printer's ability to output these eight different colors requires an inkjet set that includes at least eight separate inks, with a separate channel devoted to each ink. Thus, modern inkjet printers must have at least eight print channels. The cost to own and operate a conventional inkjet printer reflects the manufacturing cost of providing a separate channel for each of the colors.

Additionally, large-format or grand-format UV inkjet printers that are capable of printing with UV-curable white ink are becoming increasingly common. The white-ink printing capability, requiring at least one additional print channel, adds to the design complexity and the manufacturing cost of such inkjet printers.

Inkjet printing methods wherein inkjet inks are mixed with colorless liquids just prior to jetting in order to control color density are known. Additionally, it is known to produce a white inkjet ink having improved dispersion stability by mixing a white inkjet ink having a predetermined refractive index with at least one colorless liquid, such as a dispersant, a photo-initiator or a solvent.

SUMMARY

A transparent white ink composition is formulated to brighten, lighten and or dilute full-tone primary inkjet colors: cyan; magenta; yellow and black, eliminating the need for 'light ink' primary color inks. The transparent white ink is jetted concurrently with reduced amounts of full-tone inks in lighter tonal areas conventionally supported by 'light ink' primary inks. Printing 'light ink' primary colors using a transparent white ink composition may reduce the number of print channels needed to print all four primary colors and the four 'light ink' primary colors. Embodiments of the transparent white ink composition may be solvent- or water-based, drying by evaporation of the carrier fluid. Other embodiments may be radiation-curable ink compositions. An inkjet printer includes print carriage and print head assemblies configured for jetting a primary color ink and the transparent white ink in the same pass in correct proportions to achieve a desired effect.

DETAILED DESCRIPTION

A transparent white ink composition is formulated to brighten, lighten and or dilute full-tone primary inkjet colors: cyan; magenta; yellow and black, eliminating the need for 'light ink' primary color inks. The transparent white ink is jetted concurrently with reduced amounts of full-tone inks in lighter tonal areas conventionally supported by 'light ink' primary inks. Printing 'light ink' primary colors using a transparent white ink composition may reduce the number of print channels needed to print all four primary colors and the four 'light ink' primary colors. Embodiments of the transparent white ink composition may be solvent- or water-based, drying by evaporation of the carrier fluid. Other embodiments may be radiation-curable ink compositions. An inkjet printer includes print carriage and print head assemblies configured for jetting a primary color ink and the transparent white ink in the same pass in correct proportions to achieve a desired effect.

Figure 1:
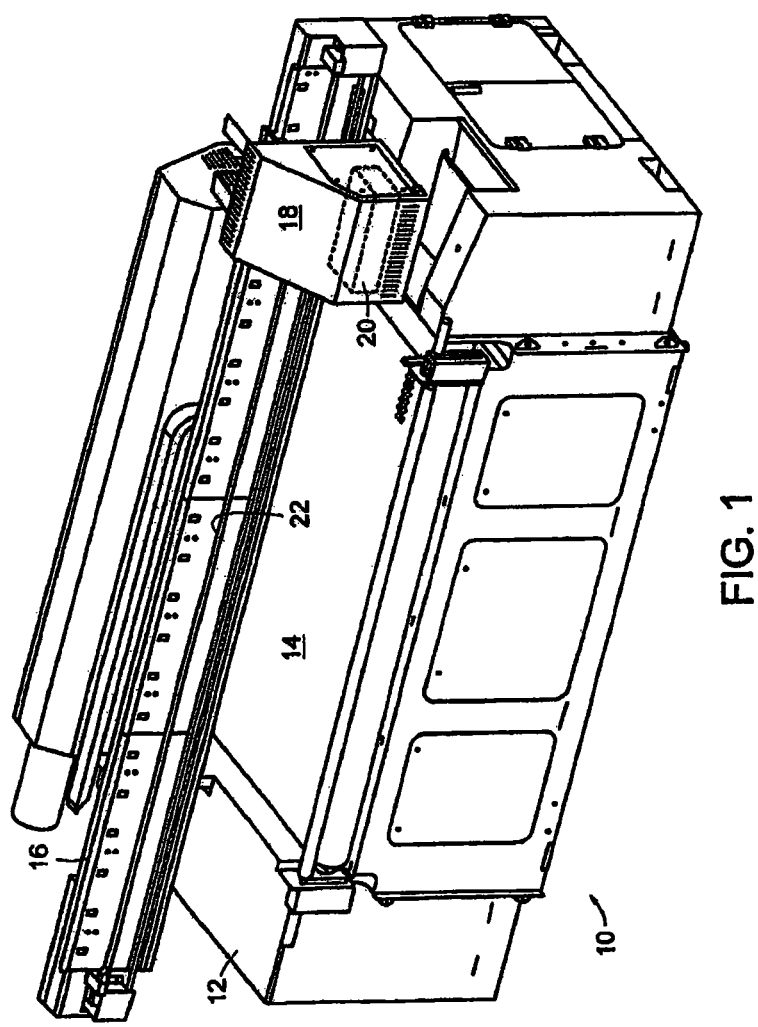
FIG. 1 provides an illustration of an inkjet printer from a system for controlling lightness in colored inkjet inks.

In an embodiment, a conventional inkjet printer may be used in the compositing of transparent white ink with primary color inks to produce light primary color inks. For example, U.S. Pat. No. 7,600,867, the entirety of which is incorporated herein by this reference, describes a grand format hybrid printer with which the principles described herein may be implemented. As in the '867 patent, FIG. 1 of the present application shows a printing system 10 adapted for printing images on a variety of substrates. Typical substrates are polyvinyl chloride (PVC) and reinforced vinyl which can be provided with peal-off backings to expose pressure sensitive adhesive. The printing system 10 is able to print on flexible as well as on non-flexible substrates, for example, metals, glass, and plastics. The ink deposited on the substrate may be water or solvent based and may be UV curable. That is, the inks may contain binders and colorants, as well as photo-initiators and surfactants. The surfactants are present in the ink to ensure that the ink is stable when in the liquid state. The binder generally consists of a blend of monomers and oligomers, and the photo-initiators are used to catalyze the polymerization reaction during which the monomers and/or oligomers are joined together to be become a polymeric binder. The polymerization generally occurs through a free-radical reaction process. When the energy from a UV source activates the photo-initiator, the photo-initiator generates free radicals which attack the double bonds in the monomer or oligomer to initiate polymerization to form a polymer chain. At this point, the binder is now a solid film of polymers that hold the colorant, which consists of pigments and/or dyes, to the substrate.

The printing system 10 may include a base 12, a transport belt 14 which moves the substrate through the printing system, a rail system 16 attached to the base 12, and a carriage 18 coupled to the rail system 16. The carriage 18 holds a series of inkjet print heads 20 and one or more radiation sources, such as UV radiation sources, and may be attached to a belt 22 which wraps around a pair of pulleys (not shown) positioned on either end of the rail system 16. A carriage motor is coupled to one of the pulleys and rotates the pulley during the printing process. As such, when the carriage motor causes the pulley to rotate, the carriage moves linearly back and forth along the rail system 16.

U.S. Pat. No. 7,090,327, the entirety of which is incorporated herein by this reference, includes one or more carriages, each of which holds a series of one or more print heads. The series of print heads receives one or more colored inks from a set of secondary ink containers which is also mounted to the carriage. In addition, a set of primary ink containers supply the inks to the secondary ink containers. In an embodiment, the series of print heads may actually be, for example, eight pairs of print heads, with each pair associated with one of the colored inks black (K), light black (LK), yellow (Y), light yellow (LY), cyan (C), light cyan (LC), magenta (M), and light magenta (LM). In other embodiments, the print heads may be associated with any colored ink. Additionally, there can be fewer than or more than 16 print heads. A primary ink container and a secondary ink container may supply a respective ink to only one print head or more than two print heads.

U.S. Pat. No. 7,673,965, the entirety of which is incorporated herein by this reference, describes an inkjet printer that includes one or more print head arrays that may be used to produce light primary colors that are composites of the transparent white ink and full-color primary color inks. As described in the '965 patent, an inkjet printer may include at least one print head array containing one or more print heads, each of which includes inkjet nozzles that may be individually controlled to eject a fluid onto a substrate. Fluids may be delivered to the print heads from a fluid reservoir system via conventional tubing systems, via channels that couple the print heads to the fluid reservoir system, or by other similar systems. Exemplary fluids that may be ejected by inkjet nozzles include colored inks, such as cyan, magenta, yellow or black ("CMYK") inks, as are commonly used in the printing industry. Colored inks also may include light cyan, light magenta, light yellow and light black In view of the foregoing, it will be readily understand that a color channel includes at least primary and secondary ink containers, or other ink reservoirs, supply lines and print heads for delivering a single color to a substrate. For example, in a carriage that includes a pair of print heads for each color, a single color channel may include the pair of print heads for the color, the secondary and primary ink containers for the color and the tubing and plumbing required to deliver the ink to the print head and then to the substrate from the ink containers.

Because the use of the transparent white ink to print light primary colors permits a significant reduction in the number of color channels required to render the light primary colors, it therefore frees a number of the channels in a carriage or a print head array for other uses. Thus, in one embodiment, the unused channels may be used for any combination of additional supporting colors or fluids such as clear gloss, clear matte, and an adhesion promoter. Additional colors may include one or more of red, blue, green, orange, white, gray, spot colors, and other similar colored inks. The inks may be solvent-based inks, dye sublimation inks, cationic inks, UV curable inks, e-beam curable inks, or other similar inks.

In an embodiment, either of a print head array or a carriage may include curing stations attached to sides of the carriage or print head array to cure or dry fluids deposited by the print heads on the substrate during printing. The curing stations may include UV lamp systems, cold UV lamp systems, UV-LED lamp systems, infrared heat sources, e-beam lamp systems, hot air convection systems or other similar systems for curing or drying.

As above, compositing light colors from a transparent white ink and primary color inks reduces the overall number of print channels required in a full-color inkjet printer. While the extra channels may be used to deliver additional liquids and ink colors, an embodiment eliminates the unneeded channels completely, allowing a significant reduction in design and manufacturing costs of an inkjet printer, with the result being a simpler print apparatus that is easier and less expensive to manufacture. Typically, the cost saving is achieved from elimination of the additional ink jet print heads, electronics supply systems and other hardware required to support the customary number of ink channels. The reduction in manufacturing cost may, of course, be ultimately passed on to end users. Thus, the cost to acquire and own an inkjet print apparatus that has the capability to render light primary colors using transparent white ink is significantly reduced.

Additionally, the reduction in the number of ink channels may be achieved without sacrificing smooth color transitions, thus maintaining quality of final, printed image.

Compositing light primary colors from transparent white ink provides a number of other advantages;

- The end user need inventory a smaller number of inks, for example, five inks instead of eight;
- Printing cost per square foot is reduced, thus allowing the end user to compete more effectively with others in the same line of business;
- A broader range of colors is attainable. The use of the transparent white allows for the use of stronger saturated primary colors. With the use of stronger saturated primary inks in combination with the transparent white, the color gamut can be expanded into currently unattainable saturated areas as well as very light, clean-hue areas;
- In an embodiment, a user may "field upgrade" a printer equipped to print with the four primary colors and transparent white to a device having eight or more channels some time after initial purchase, allowing him or her to buy in at lower cost and upgrade to enhance print capabilities by using some combination of: orange, green, blue, violet, red, blue, white, metallics, clear gloss, clear matte, adhesion promoter, and so on.

Figure 2:
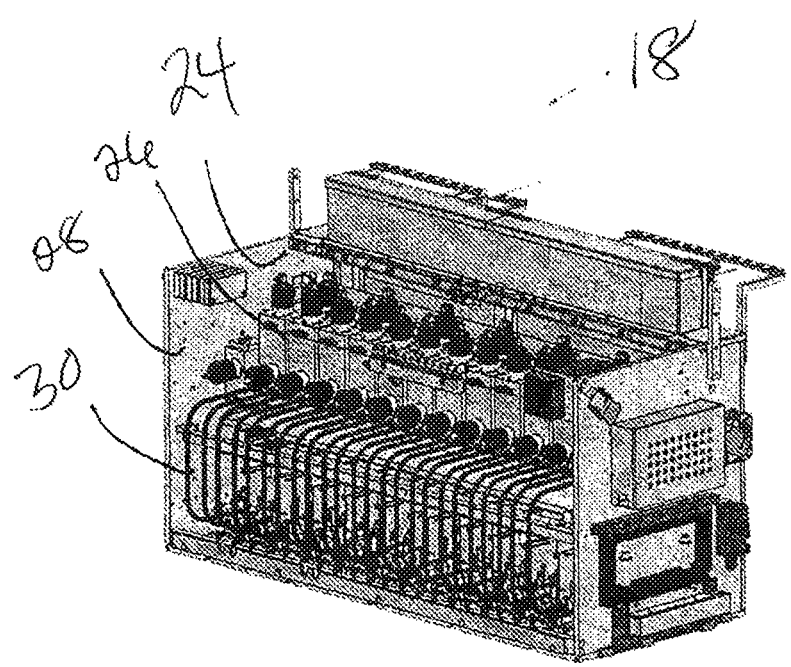
FIG. 2 provides an isometric drawing of a carriage from the printer of FIG. 1
Figure 3:
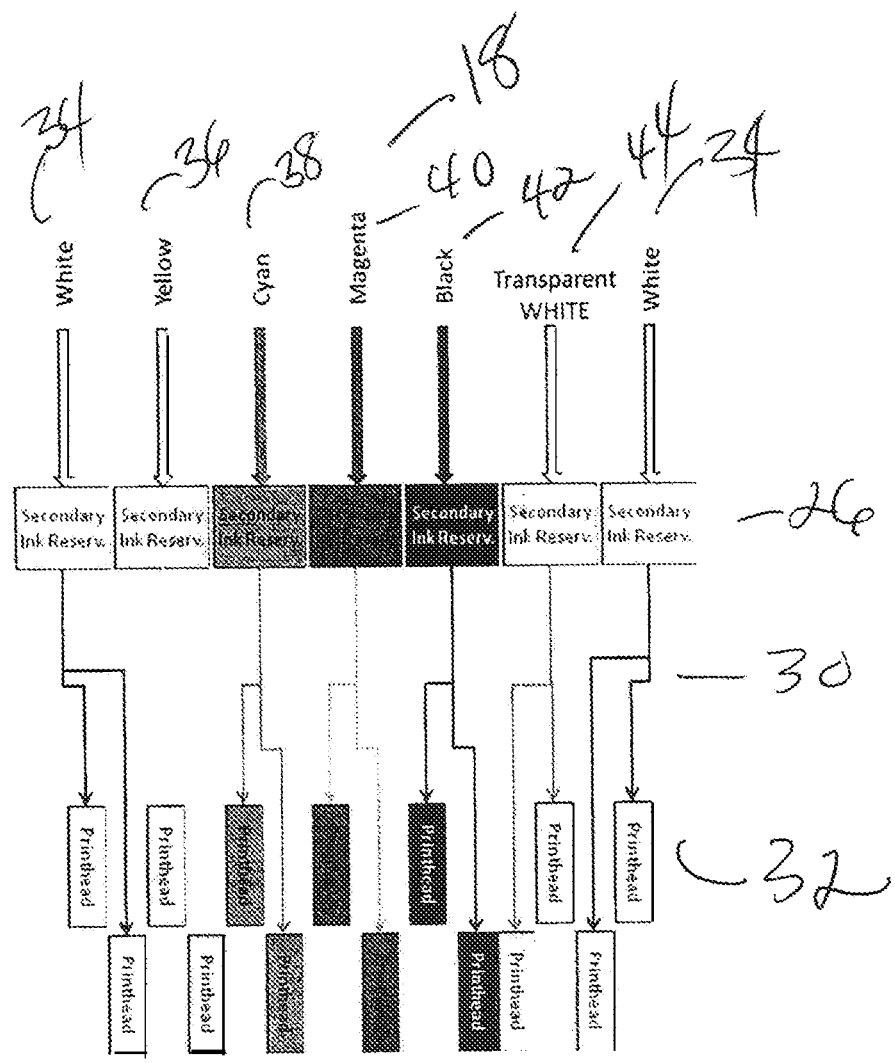
FIG. 3 provides a schematic diagram of the carriage of FIG. 2

As above a print system 10 may include one or more carriages 18, each carriage including a number of print heads 32. Referring now to FIG. 2, shown is a more detailed representation of the carriage 18 shown in FIG. 1. In an embodiment, for each color channel, the carriage 18 may have installed therein, at least one secondary ink reservoir 26. Each secondary ink reservoir is in fluid communication with a primary ink reservoir (not shown) by means of at least one solenoid valve 24. In turn, each secondary ink reservoir is in fluid communication with at least one print head 32 by means of at least one second solenoid valve 28 and at least one liquid line 30. It will be appreciated that the carriage 18 may provide as few as five color channels or up to ten, or even more channels. FIG. 3, for example, shows an embodiment wherein the carriage 18 includes a total of seven channels: two for opaque white 34, and one each for yellow 36, cyan 38, magenta 40, black 42 and transparent white 44. A fuller description of the carriage may be found in U.S. Pat. No. 7,396,119, the entirety of which is incorporated herein by this reference thereto.

Formulation of a Transparent White Ink Composition

A transparent white ink is formulated to brighten, lighten and or dilute full-tone primary inkjet colors (cyan-magenta-yellow-black). An embodiment of a transparent white ink composition may be formulated according to methods and formulae described in United States patent application pub. no. 2011/0045199, which is hereby incorporated herein in its entirety. As described in the 199 publication, a radiation curable ink composition may comprise one or more of:
- a dendritic or hyperbranched polyester acrylate component;
- an oligomer component;
- a monomer component;
- a photo-initiator component;
- a colorant component; and
- an additive component.

Dendritic or Hyperbranched Polyester Acrylate Component

In embodiments, the dendritic or hyperbranched polyester acrylate component may comprise 10-45% by weight of the ink compositions. In a further embodiment, the dendritic or hyperbranched polyester acrylate component may comprises 10-30% by weight of the ink compositions. In a still further embodiment, the dendritic or hyperbranched polyester acrylate component comprises 10-25% by weight of the ink compositions.

In an embodiment, the dendritic or hyperbranched polyester acrylate in the component has a functionality of greater than 5. In other embodiments, the dendritic or hyperbranched polyester acrylate in the component has a functionality in the range of 6-12.

Oligomer Component

The ink compositions comprise an oligomer component. In an embodiment, the amount of the oligomer component in the ink compositions may be 1-15% by weight. In an embodiment, the amount of the oligomer component may be 5-10% by weight. In an embodiment, the oligomer component may comprise at least one of:
- an acrylic oligomer;
- a urethane(meth)acrylate oligomer;
- a polyester based (meth)acrylate oligomer; and
- a polyether based (meth)acrylate oligomer and
- an epoxy(meth)acrylate oligomer.

One of more embodiments use an oligomer component of low viscosity, low volatility, high reactivity, low glass transition temperature, and good adhesion to multiple substrates in the ink compositions. In an embodiment, the functionality of the oligomer component is not greater than 3. In an embodiment, the functionality of the oligomer component is not greater than 2. The low functionality contributes to more flexible ink compositions. An oligomer component combined with a hyperbranched polyester acrylate component can significantly improve ink adhesion to a wide range of substrates, including substrates that are difficult for radiation curable inkjet inks to adhere to, such as polyolefins.

Monomer Component

The ink composition may also comprise a monomer component. The amount of the monomer component in the ink composition may be 30-80% by weight in one embodiment. In one embodiment, the monomer component may be 30-60% by weight of the ink composition. The type and amount of monomer component is selected to offer good solvency to the dendritic or hyperbranched polyester acrylate component and the oligomer component in ink formulations, which dilutes the ink to a low viscosity. In an embodiment, the monomer component may have low glass transition temperature, which contributes to the flexibility of ink after curing. In an embodiment, the functionality of the monomer does not exceed 2 to create more flexible ink compositions.

In one embodiment, the monomer component comprises both monofunctional and difunctional monomers.

Examples of suitable mono-functional monomers include, but are not limited to, tetrahydrofurfuryl acrylate, tetrahydrofurfuryl methacrylate, vinyl caprolatam, isobornyl acrylate, isobornyl methacrylate, 2-phenoxyethyl acrylate, 2-phenoxyethyl methacrylate, 2-(2-ethoxyethoxy)ethyl acrylate, isooctyl acrylate, isodecyl acrylate, isodecyl methacrylate, lauryl acrylate, lauryl methacrylate, stearyl acrylate, stearyl methacrylate, cyclic trimethylolpropane formal acrylate, 3,3,5-trimethylcyclohexane acrylate, and monofunctional methoxylated PEG (350) acrylate, etc.

Examples of suitable di-functional monomers include, but not are limited to, diacrylates or dimethacrylates of diols and polyetherdiols, such as propoxylated neopentyl glycol diacrylate, 1,6-hexanediol diacrylate, 1,6-hexanediol dimethacrylate, 1,3-butylene glycol diacrylate, 1,3-butylene glycol dimethacrylate 1,4-butanediol diacrylate, 1,4-butanediol dimethacrylate, alkoxylated aliphatic diacrylate (e.g. SR9209A from Sartomer®), diethylene glycol diacrylate, diethylene glycol dimethacrylate, dipropylene glycol diacrylate, tripropylene glycol diacrylate, triethylene glycol dimethacrylate, and alkoxylated hexandiol diacrylates, e.g. SR562, SR563, SR564 from Sartomer®.

Photo-Initiator Component

The ink composition may comprise a photo-initiator component. In the radiation curing process, the photo-initiator component initiates the curing in response to incident radiation. The amount of a photo-initiator component in the ink compositions may be 1-20% by weight. In an embodiment, the amount of photo-initiator component may be 5-15% by weight. The selection of the type of photo-initiator component in the ink compositions is generally dependent on the wavelength of curing radiation and the colorant employed in the ink compositions. In an embodiment, the peak absorption wavelengths of selected photo-initiator vary with the range of wavelength of curing radiation to effectively utilize radiation energy, especially using ultraviolet light as radiation.

Examples of suitable photo-initiators include, but are not limited to, 1-hydroxycyclohexylphenyl ketone, 4-isopropylphenyl-2-hydroxy-2-methyl propan-1-one, 1-[4-(2-hydroxyethoxy)-phenyl]-2-hydroxy-2-methyl-1-propan-1-one, 2,2-dimethyl-2-hydroxy-acetophenone, 2,2-dimethoxy-2-phenylacetophenone, 2-hydroxy-2-methylpropionphenone, Diphenyl(2,4,6-trimethylbenzoyl)phosphine oxide, bis(2,6-dimethoxy-benzoyl)-2,4,6 trimethyl phenyl phosphine oxide, 2-methyl-1-1[4-(methylthio)phenyl]-2-morpholino-propan-1-one, 3,6-bis(2-methyl-2-morpholino-propionyl)-9-n-octylcarbazole, 2-benzyl-2-(dimethylamino)-1-(4-morpholinyl)phenyl)-1-butanone, benzophenone, 2,4,6-trimethylbenzophenone, isopropyl thioxanthone. Suitable blends of photo-initiators commercially available include, but are not limited to, those under the designations of Darocur 4265, Irgacure 2022, Irgacure 2100 from Ciba® Specialty Chemicals; and Esacure KT37, Esacure KT55, Esacure KTO046 from Lamberti®.

The photo-initiator component may further comprise a co-initiator. The amount of co-initiator component may be 0-15% by weight of the ink compositions, or, in at least one embodiment, 0-10% by weight of the ink compositions, or, in at least one embodiment, preferably 2-7% by weight of ink compositions. The co-initiator component is used to activate photo-initiators to initiate polymerization or is used to improve the surface curing of ink by mitigating oxygen inhibition to free radicals generated by photo-initiators.

Examples of suitable co-initiators include, but are not limited to, those under the designations of CN386, CN384, and CN383 from Sartomer® and Ebecryl 7100 from Cytec® Surface Specialty.

Additive Component

In an embodiment, the ink compositions further comprise an additive component. Various additives can be included in the ink compositions, including a surfactant, a leveling additive, or a stabilizer, and so on.

A surfactant may be used to reduce the surface tension of the ink compositions to improve wetting property of the inks on substrates. The amount of surfactant in the ink compositions is 0.01-2% by weight, and preferably 0.05-0.5% by weight. It is preferred that the surfactant comprises at least one polysiloxane acrylate, also known as a silicone acrylate, which participates in the radiation curing process to be part of cured ink. Examples of a suitable surfactant include, but are not limited to, those under the designations of Tegorad 2200N, Tegorad 2100, and Tegorad 2300 from Goldschmidt® Chemical Corp., and BYK 377, BYK 3510, BYK 307, and BYK 330 from BYK Chemie®.

A leveling additive may be used to improve the flowing property of ink to produce a more uniform surface of ink film. The amount of leveling agent in the ink compositions is 0.1-2% by weight. Examples of suitable leveling agents include, but are not limited to, those under the designation of BYK 361N, BYK 353, and BYK 354 etc. from BYK Chemie®.

A stabilizer may be used to improve shelf life and photolytic stability of ink compositions. Stabilizers in the ink compositions can include an ultraviolet light stabilizer, a free radical scavenger stabilizer, etc. Examples of ultraviolet light stabilizers include ultraviolet absorber stabilizer and hindered amine light stabilizer. These stabilizers are used to improve the outdoor durability and weatherability of cured ink. Commercially available ultraviolet light stabilizers include, but are not limited to, those under the designation of Tinuvin 460, Tinuvin 479, Tinuvin171, Tinuvin 928, Tinuvin123, and Tinuvin 292 from Ciba® Specialty Chemicals, etc. They can be present in the ink compositions in amounts of 0.01%-2% by weight, and more specifically 0.1%-1% by weight.

A free radical scavenger stabilizer may be used to improve the stability of ink against heat. Examples of a free radical scavenger include, but are not limited to, hydroquinone, 4-methoxyphenol, hindered phenol, etc. The amount of free radial scavenger stabilizer can be present in ink compositions in 0.05-1% by weight, and more specifically 0.1-0.75% by weight. A small amount is preferably used in the ink compositions to minimize their interference with the radiation curing process.

Colorant Component

An exemplary opaque white ink formulation may contain a colorant component comprising a titanium dioxide based pigment in an amount at 5% by weight. An embodiment of the transparent white ink formulation may contain colorant at the amount 2.5% by weight, or less. In an embodiment, the colorant component may constitute 1.5% or less by weight.

One skilled in the art will readily understand that the transparent character of the transparent white ink formulation is achieved through degrees of dilution of the colorant.

In an embodiment, zinc oxide-based pigment is used instead of titanium dioxide. The zinc-oxide pigment offers the advantage of being inherently more transparent than the titanium-based pigment. The optical characteristics of the zinc oxide-based pigment allow formulation of the transparent white ink composition with greater amounts of colorant than with titanium dioxide-based pigment, thereby providing a salutary effect on the stability of the transparent white ink composition. During storage and during use, it is desirable to circulate the ink regularly in order to keep the colorant component in suspension.

Application of a Transparent White Ink Composition

Figure 4:
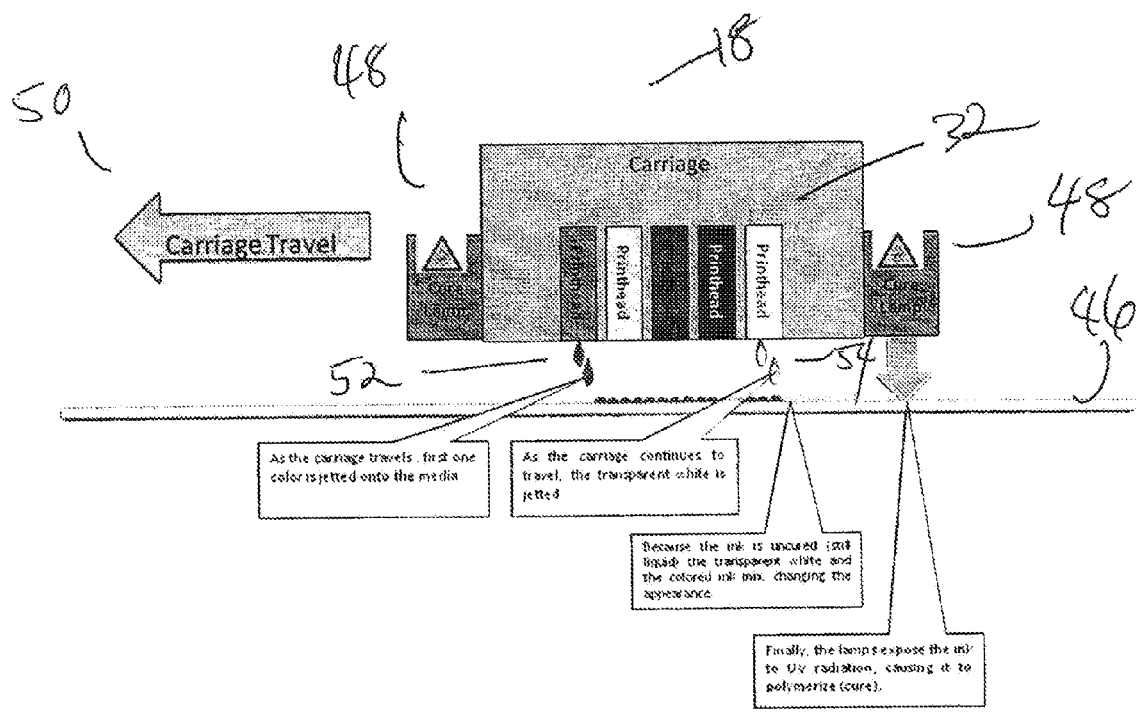
FIG. 4 provides a schematic of the carriage of FIGS. 2 and 3 engaged in the operation of jetting a composite light primary-color ink onto a substrate.

In an embodiment, the transparent white inkjet ink is jetted in the same pass 50 of the carriage 18 as the primary colors are jetted, as shown in FIG. 4. When being jetted with the transparent white ink 54, the amount of full-tone primary ink 52 is reduced. The transparent white ink 54 is only jetted onto the substrate 46 concurrently with the full-tone primary ink 52 in lighter tonal areas conventionally supported by light primary inkjet inks: light cyan; light magenta; light yellow and light black.

In an embodiment the primary color 52 and the transparent white 54 are jetted onto the same area conventionally supported by light primary inkjet inks in succession, but with no curing in between the application of the two inks. As shown in FIG. 4, an embodiment of the carriage 18 may include one or more cure lamps 48. In an embodiment, the primary color 52 is applied first. In a further embodiment, the transparent white 54 is applied first.

The end result of jetting of the primary 52 and transparent white 54 inks without curing between application of each is the mixing of the two inks on the substrate 46 to produce a composite light primary color ink.

Following application of the two inks, the composite ink is cured or dried by means of a cure lamp 48.

In an embodiment, the foregoing principles may be applied to the production of any sort of composite ink by jetting at least two inks onto the same region of the substrate without curing in between application of each ink. Application of the inks may either by concurrent or it the inks may be applied in rapid succession. The result of apply multiple inks to the same region of the substrate without curing in between application of each ink is that the inks combine on the substrate, blending to form a single, composite ink. Following application of the separate inks, the resulting composite ink may be cured as described herein above. Additionally, at least one of the substances may be a liquid other than an ink, such as a solvent, a surfactant or a drier.

Printer Controller

It is to be appreciated that the operations involved in compositing of transparent white ink and primary color inks to produce composite light primary color inks immediately upon the substrate are performed under the direction of a control means such as a raster image processor (RIP).

Figure 5:
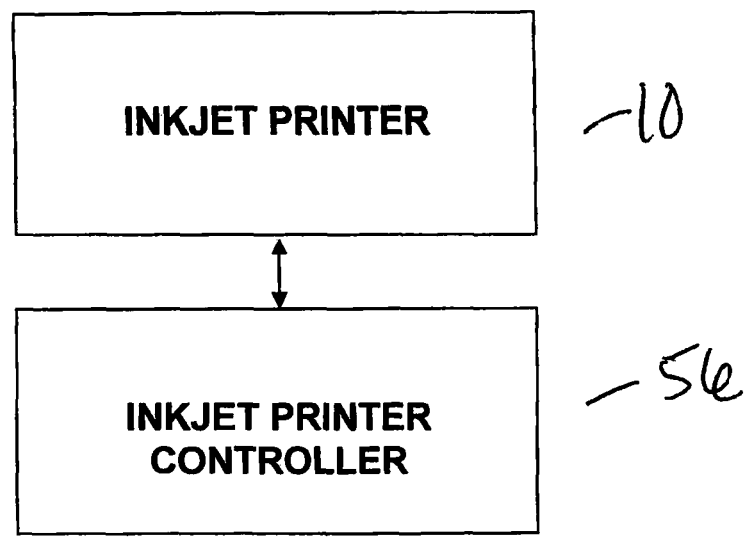
FIG. 5 provides a block diagram of a system for controlling lightness in colored inkjet inks by means of a transparent white ink composition.

As shown in FIG. 5, the system may include a printing device 10 and a controller 52. In an embodiment, the controller 56 may be a raster image processor (RIP) such as the FIERY raster image processor produced by ELECTRONICS FOR IMAGING, Inc. (Foster City, Calif.). In an embodiment, the RIP may be implemented as a firmware program executed on a processing element, such as a microprocessor, integrated with the inkjet printing device 10. In an embodiment, the RIP may be a stand-alone hardware RIP. In a still further embodiment, the RIP may be a software program operating on a server or a workstation, for example, a color management server, within a network of computing devices as described herein below in connection with FIG. 6.

Figure 6:
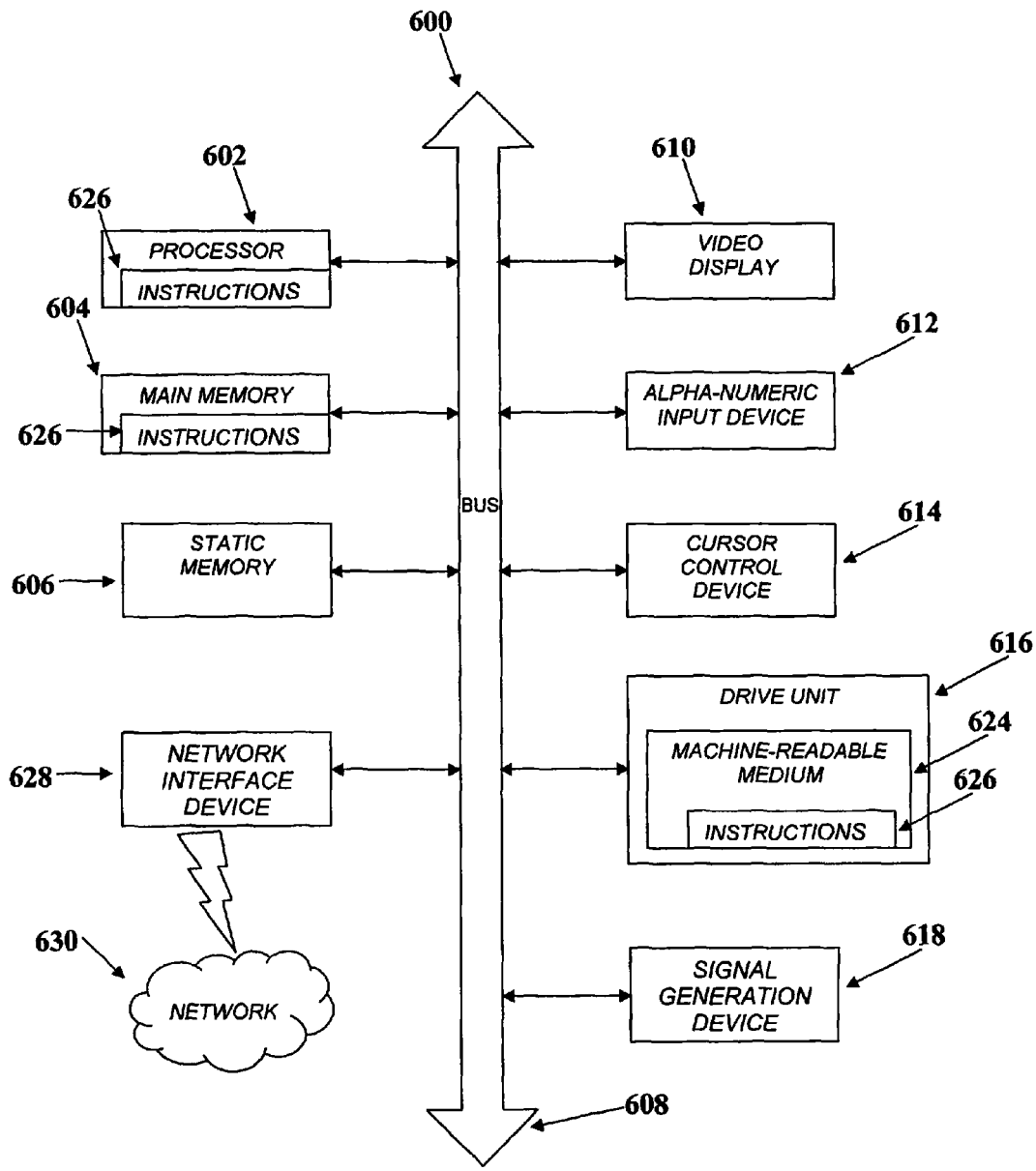
FIG. 6 provides a diagram of a machine in the exemplary form of a computer system within which a set of instructions, for causing the machine to perform any one of the methodologies discussed herein below, may be executed.

Referring now to FIG. 6, shown is a diagrammatic representation of a machine in the exemplary form of a computer system 600 within which a set of instructions for causing the machine to perform any one of the methodologies discussed herein may be executed. In alternative embodiments, the machine may comprise a network router, a network switch, a network bridge, personal digital assistant (PDA), a cellular telephone, a web appliance or any machine capable of executing a sequence of instructions that specify actions to be taken by that machine.

The computer system 600 includes a processor 602, a main memory 604 and a static memory 606, which communicate with each other via a bus 608. The computer system 600 may further include a display unit 610, for example, a liquid crystal display (LCD) or a cathode ray tube (CRT). The computer system 600 also includes an alphanumeric input device 612, for example, a keyboard; a cursor control device 614, for example, a mouse; a disk drive unit 616, a signal generation device 618, for example, a speaker, and a network interface device 628.

The disk drive unit 616 includes a non-transitory machine-readable medium 624 on which is stored a set of executable instructions, i.e. software, 626 embodying any one, or all, of the methodologies described herein. The software 626 is also shown to reside, completely or at least partially, within the main memory 604 and/or within the processor 602. The software 626 may further be transmitted or received over a network 630 by means of a network interface device 628.

In contrast to the system 600 discussed above, a different embodiment uses logic circuitry instead of computer-executed instructions to implement processing the various methodologies herein described. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large scale integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments of this invention may be used as or to support software programs executed upon some form of processing core (such as the Central Processing Unit of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A method for producing a composite lightened primary color inkjet ink comprising:
    jetting an amount of a first UV curable inkjet ink onto a predetermined region of a substrate;
    while said first UV curable inkjet ink remains uncured, jetting an amount of a second UV curable inkjet ink onto said predetermined region of said substrate;
    wherein said first UV curable ink is selected from a group comprising a primary color inkjet ink and a transparent white inkjet ink, said transparent white inkjet ink comprising one or more of:
        a dendritic or hyperbranched polyester acrylate component present in said composition in an amount of 10% to 45% by weight of said composition;
        an oligomer component present in said composition in an amount of 1% to 15% by weight of said composition;
        a monomer component present in said composition in an amount of 30% to 60% by weight of said composition;
        a photo-initiator component present in said composition in an amount of 1% to 20% by weight of said composition; and
        a colorant component present in said composition in an amount of no greater than 5% by weight of said composition, said colorant comprising at least one white pigment; and
    wherein said second UV curable inkjet ink comprises the remaining inkjet ink in said group after selection of said first UV curable inkjet ink; and
    with a UV light source, curing said amounts of said first and second UV curable inkjet inks jetted onto said predetermined region;
    wherein blending of said first and second UV curable inkjet inks on said predetermined region in their uncured state produces a composite lightened primary color inkjet ink.

2. The method of claim 1, wherein said first inkjet ink comprises said primary color inkjet ink and wherein said second inkjet ink comprises said transparent white inkjet ink.

3. The method of claim 1, wherein said first inkjet ink comprises said transparent white inkjet ink and said second inkjet ink comprises said primary color inkjet ink.

4. The method of claim 1, wherein said primary color inkjet ink is selected from a group consisting of cyan, magenta, yellow and black inkjet inks.

5. The method of claim 1, wherein said amount of said transparent white inkjet ink is selected to lighten said primary color inkjet ink by a predetermined amount.

6. The method of claim 1, wherein said lightened primary color inkjet ink comprises a replacement for a pre-formulated light primary color inkjet ink.

7. The method of claim 6, wherein said predetermined region comprises a region specified by a page description to receive a light primary color inkjet ink.

8. The method of claim 1, further comprising:
    jetting said first and second inkjet inks from separate color channels.

* * * * *